(12) United States Patent
Schliermann

(10) Patent No.: US 8,195,390 B2
(45) Date of Patent: Jun. 5, 2012

(54) NAVIGATION DEVICE AND METHOD FOR OPERATING A NAVIGATION DEVICE

(75) Inventor: Christian Schliermann, Eibelstadt (DE)

(73) Assignee: Garmin Würzburg GmbH (DE)

( * ) Notice: Subject to any disclaimer, the term of this patent is extended or adjusted under 35 U.S.C. 154(b) by 837 days.

(21) Appl. No.: 12/198,665

(22) Filed: Aug. 26, 2008

(65) Prior Publication Data

US 2009/0063040 A1    Mar. 5, 2009

(30) Foreign Application Priority Data

Sep. 5, 2007   (DE) .......................... 10 2007 042 038

(51) Int. Cl.
     *G01C 21/00*      (2006.01)

(52) U.S. Cl. ........ 701/409; 701/410; 701/411; 701/412; 701/300; 701/533; 340/995.19

(58) Field of Classification Search .................. 701/200, 701/201, 207, 208, 209, 204, 213, 214, 300, 701/409, 410, 411, 412, 533; 340/988, 990, 340/995.19

See application file for complete search history.

(56) References Cited

U.S. PATENT DOCUMENTS

| | | | | |
|---|---|---|---|---|
| 5,771,280 A * | 6/1998 | Johnson | ...................... | 379/93.23 |
| 6,133,947 A | 10/2000 | Mikuni | | |
| 6,697,731 B2 * | 2/2004 | Takayama et al. | ............. | 701/200 |
| 2001/0029425 A1 * | 10/2001 | Myr | ............... | 701/200 |
| 2003/0006914 A1 * | 1/2003 | Todoriki et al. | ................ | 340/995 |
| 2005/0270311 A1 * | 12/2005 | Rasmussen et al. | .......... | 345/677 |
| 2007/0219711 A1 * | 9/2007 | Kaldewey et al. | ............. | 701/208 |

OTHER PUBLICATIONS

Garmin Owner's Manual, Nuvi 600/650, Personal Travel Assistant (Mar. 2007).

\* cited by examiner

*Primary Examiner* — Gertrude Arthur Jeanglaude
(74) *Attorney, Agent, or Firm* — Samuel M. Korte

(57) ABSTRACT

A navigation device (1) including an input device for inputting operator commands and/or location data, particularly starting points and/or destinations, a road network database, a route calculating unit for calculating a planned route with consideration of the location data and the road network database, wherein the route leads from the starting point to the destination, a signal receiving unit for receiving position signals, particularly GPS-signals, a position determining unit that determines the current position based on the position signals, and at least one optical display device, has an editable image database, in which image data files (7) provided for being displayed on the display device can be managed in a user-defined fashion and method of operation.

17 Claims, 2 Drawing Sheets

NAVIGATION DEVICE AND METHOD FOR OPERATING A NAVIGATION DEVICE

CROSS-REFERENCE TO RELATED APPLICATION

This application claims the priority benefit of German Patent Application No. 10 2007 042 038.4 filed on Sep. 5, 2007, the contents of which are hereby incorporated by reference as if fully set forth herein in their entirety.

STATEMENT CONCERNING FEDERALLY SPONSORED RESEARCH OR DEVELOPMENT

Not applicable.

FIELD OF THE INVENTION

The invention pertains to a navigation device including an input device for inputting operator commands and/or location data, particularly starting points and/or destinations, a road network database, a route calculating unit for calculating a planned route with consideration of the location data and the road network database, wherein the route leads from the starting point to the destination, a signal receiving unit for receiving position signals, particularly GPS-signals, a position determining unit that determines the current position based on the position signals, and at least one optical display device. The invention furthermore pertains to a method for operating the navigation device.

BACKGROUND OF THE INVENTION

Navigation devices of the generic type are used particularly, but not exclusively, in vehicles in order to direct the driver from a starting point to a destination. In this respect, one distinguishes between mobile navigation devices and permanently installed navigation devices. A road network database is used for calculating a route leading from the starting point to the destination with the aid of a route calculating unit. A signal receiving unit receives position signals, particularly GPS-signals, and a position determining unit determines the current position based on these position signals. A display device such as, for example, a flat-panel display, serves for optically displaying the route to be driven and for displaying user menus.

Conventional navigation devices are preconfigured by the manufacturer such that their physical appearance is identical for all users. The physical appearance of conventional navigation devices cannot be individually adapted. In this respect, the user is unable to adjust the physical appearance of the navigation device to his individual desires and preferences.

SUMMARY OF THE INVENTION

The present invention provides a new navigation device, the physical appearance of which can be individually customized in accordance with the requirements of individual users. The present invention furthermore provides a corresponding method for operating a navigation system.

In one embodiment of the invention, a navigation device includes an editable image database, in which image data files provided for being displayed on the display device can be managed in a user-defined fashion. A method of operating the navigation device includes storing an image data file in the editable image database. By providing an editable image database in the navigation device, the user is able to manage, particularly store, image data files in this image database in accordance with his desires.

The image data files with the images contained therein are stored in the image database and can be used for individualizing the physical appearance of the navigation device. The images can be read out of the image data files by the navigation device in a program-controlled fashion and displayed on the display device by means of a suitable program invocation. There exist numerous options for individualizing the physical appearance of the navigation device with the aid of the individually managed image data files. According to one preferred embodiment, it is proposed that the image database forms part of an address database or is linked to an address database. Individual addresses in the address database can be assigned to an image data file in a user-defined fashion in this case. If an address with a user-defined image data file assigned thereto is accessed during the operation of the navigation device, the image content of this image data file can be displayed accordingly.

In order to reduce the number of image data files to be stored, address groups can be formed in the address database. A user-defined image data file is then jointly assigned to all addresses of the same address group. For example, all locations of a business can form an address group, wherein the common business icon is assigned to all addresses of this address group as image data file.

The image data files stored in the image database essentially may contain any type of images. A particularly high recognition value and a corresponding individualization can be achieved with image data files, in which photographs are stored, particularly photographs of buildings and persons. For example, it is possible to store the image of the building located at an address, for example, a church or a company head office, and to assign this image to the corresponding address. It is also possible to store portraits or other photographs of persons for certain addresses.

However, it is not only sensible to assign image data files to certain addresses. According to a second variation, certain display functions of the navigation device can also be individually reconfigured by the user. To this end, certain display functions of the navigation device are linked to user-defined image data files. As soon as the display function is invoked in a program-controlled fashion, the corresponding image data file is displayed on the display device. Such individualized display functions may consist, for example, of buttons or keys to be superimposed on the display.

The utilization of schematized image graphics is particularly advantageous for the individual design of display functions, but certainly not only for this purpose. Such schematized image graphics that are also referred to as icons can be stored as image data files in the image database and assigned, for example, to a certain display function Naturally, it is also possible to assign such schematized image graphics to other functional elements, for example, an address in an address database.

The display function for displaying the current position of a vehicle is of the utmost importance for the physical appearance of a navigation device. This display function is frequently realized in the form of a schematized arrow symbol, wherein this arrow symbol is superimposed on a map displayed on the display device at the current position of the vehicle. In order to individualize this important display function for the physical appearance of the navigation device, it is proposed to superimpose a user-defined image data file stored in the image database at the location of the current vehicle position. This image data file may consist, in particular, of a suitable vehicle icon. The utilization of correspondingly individualized vehicle icons provides the various vehicle manufacturers with the option of specifically adapting the navigation devices installed in their vehicles to their types of vehicles.

If a large number of image data files is stored in the image database, it is necessary to provide a correspondingly large storage space. In order to individually adapt the size of the storage space to the requirements of the user, it is particularly advantageous to store the image data files on a removable storage medium, particularly on an exchangeable memory card. This provides the user with the option of correspondingly increasing the available storage space by exchanging the removable storage medium.

The method includes storing image data files in an editable image database of the navigation device by the user and the content of the image data file is displayed on the display device in a program-controlled fashion after invoking the image data file. Consequently, the user has the option of storing individualized image contents on the navigation device, wherein these image contents are automatically retrieved from the image database by the navigation device in accordance with the pre-programmed program sequence and displayed.

If an image data file was assigned to an address of an address database, a first preferred variation of the method proposes that, when a map section containing an address with an image data file assigned thereto is displayed on the display device, the image content of the assigned image data file is displayed at the position of the address. Consequently, individual image contents of the image database are always displayed to the user during the navigation along the route when map sections are displayed that contain addresses with individual image data files assigned thereto. For example, a sales representative has the option of superimposing the respective company logo of the customers at the corresponding locations of his customers.

According to a second variation of the method for linking image data files with addresses in an address database, it is proposed that, when displaying selection menus that comprise addresses with image data files assigned thereto, the assigned image data file is displayed at the position of the address. If destinations that were already visited are displayed, for example, it would be possible to display an image alternatively or additionally to the respective address in order to simplify the selection for the user.

In order to simplify the assignment of image data files to addresses in the address database for the user, it is particularly advantageous to superimpose a list of all available image data files when a new address needs to be stored in the address database. An image data file can then be permanently assigned to the address by simply selecting the corresponding image data file.

Depending on the display scale and the size of the display device, it is not always sensible to display image data files assigned to individual addresses or the image size needs to be sensibly adapted to the available display size. This can be realized by assigning an image data file priority value to the individual image data files. As soon as the image content of the corresponding image data file needs to be displayed, the display of the image data file, particularly the image size of the image data file displayed, is changed in dependence on the scale of the map section and in dependence on the image data file priority value. In this case, image data files with a high image data file priority value have preference and are displayed in a correspondingly enlarged fashion while image data files with a low image data file priority value are reduced or not displayed.

In order to easily load the image data files on the navigation device, it is particularly advantageous to establish a data link with a database, for example, an Internet server. Large image data files and/or large image databases can be easily downloaded to and stored on the navigation device in this fashion.

According to another variation of the method, it is proposed that an image data file is also assigned to individual locations pre-stored in the road network database, particularly so-called Points of Interest (POI). For example, a famous building monument such as, e.g., the Cologne Cathedral may be assigned an image of this building monument.

The assignment of image data files to locations pre-stored in the road network database can be realized in a particularly simple fashion if such a pre-stored location is stored in the form of a new address in an address database, wherein an image data file is respectively assigned to the pre-stored location when it is stored in the address database.

In order to preclude problems with excessively large image data files, the size of the image data file can be checked in a program-controlled fashion when it is stored and/or assigned to an address or display function.

If it is determined that a predefined maximum size is exceeded during the check of the image data file size, it is possible to prevent the storage or assignment of the respective image data file and, for example, to output a corresponding error message.

Alternatively, the image data file may also be automatically reduced if the predefined maximum size is exceeded, for example, by scaling the image data file accordingly.

Different aspects of the invention are schematically illustrated in the drawings and described in an exemplary fashion below.

DETAILED DESCRIPTION OF THE EXAMPLE EMBODIMENTS

Figure 1:
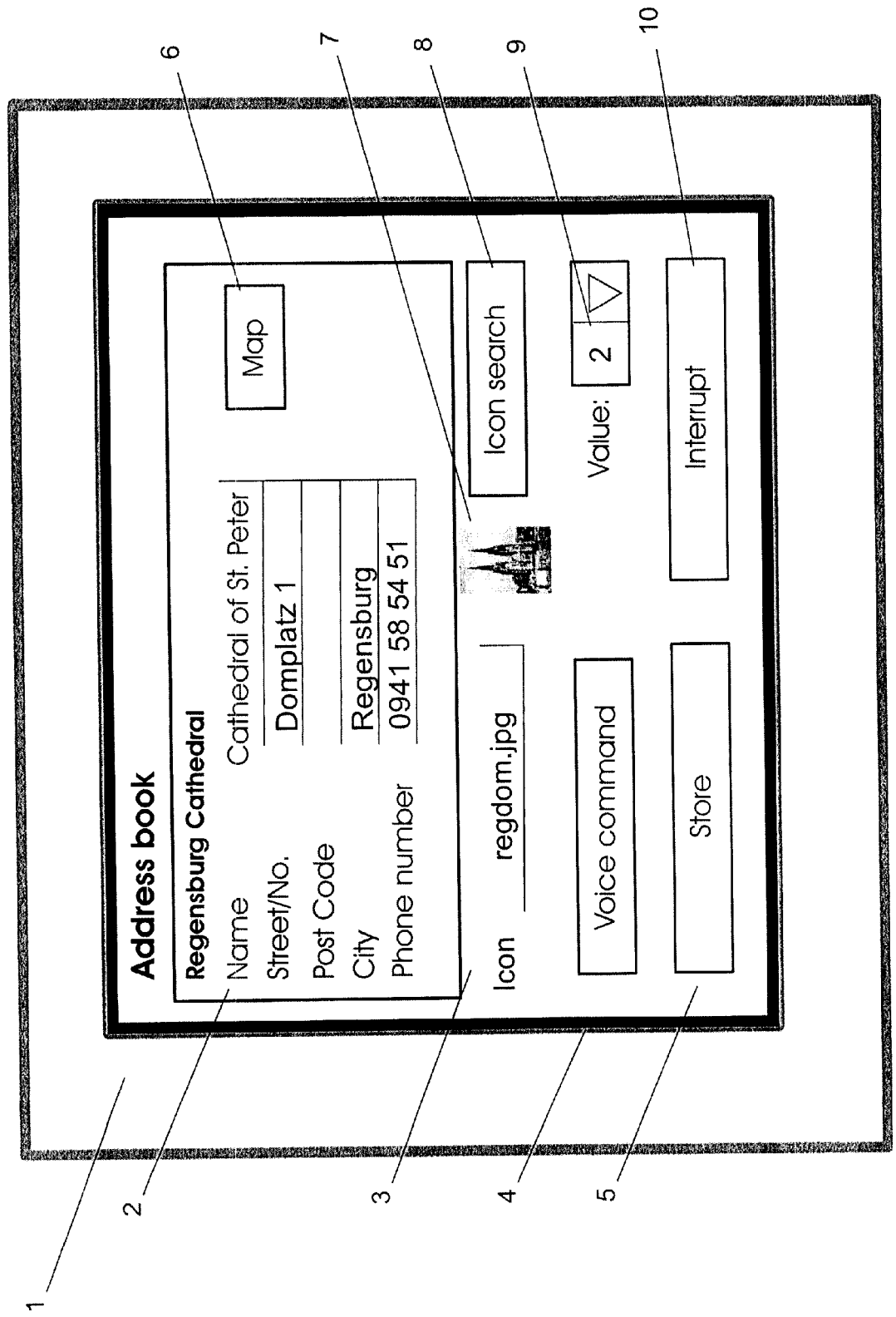
FIG. 1 shows the display of a navigation device during the editing of the address database in order to assign an image data file to an address.

FIG. 1 schematically shows the display of a navigation device 1 during the editing of an address database. In this case, the entry of a new address in the address book is illustrated in FIG. 1. Each address book entry features a superimposed index card, in which all data of the respective address can be recorded and modified. The name of the destination, the street of the destination, the city of the destination and a corresponding telephone number can be entered and stored in a first address data field 2.

It is also possible to assign an image data file stored in an image database on a data storage device disposed in the navigation device 1 to the address entered into the address field 2 in a user-defined fashion. To this end, the data file name of the corresponding image data file is entered into an image data file field 3, wherein the data file name "regdom.jpg" is entered in the example shown. In order to simplify the entry of the corresponding image data file name, it is possible to actuate the key 8 "icon search" in order to transfer the user to a data file selection dialog. In this not-shown data file selection dialog, the user can select a data file from all image data files stored in the image database and assign this data file to the address book entry.

Furthermore, an image data file priority value can be stored with the address in a field 9. In the example shown, the image data file "regdom.jpg" has the image data file priority value 2. The scale on which the image content 7 of the image data file "regdom.jpg" is displayed is defined based on the image data file priority value.

In addition, two voice commands can be assigned to the address by means of a key 4. The address book entry is stored by pressing the key 5. The address book entry can be canceled and the storage thereof can be interrupted by pressing the key 10.

Figure 2:
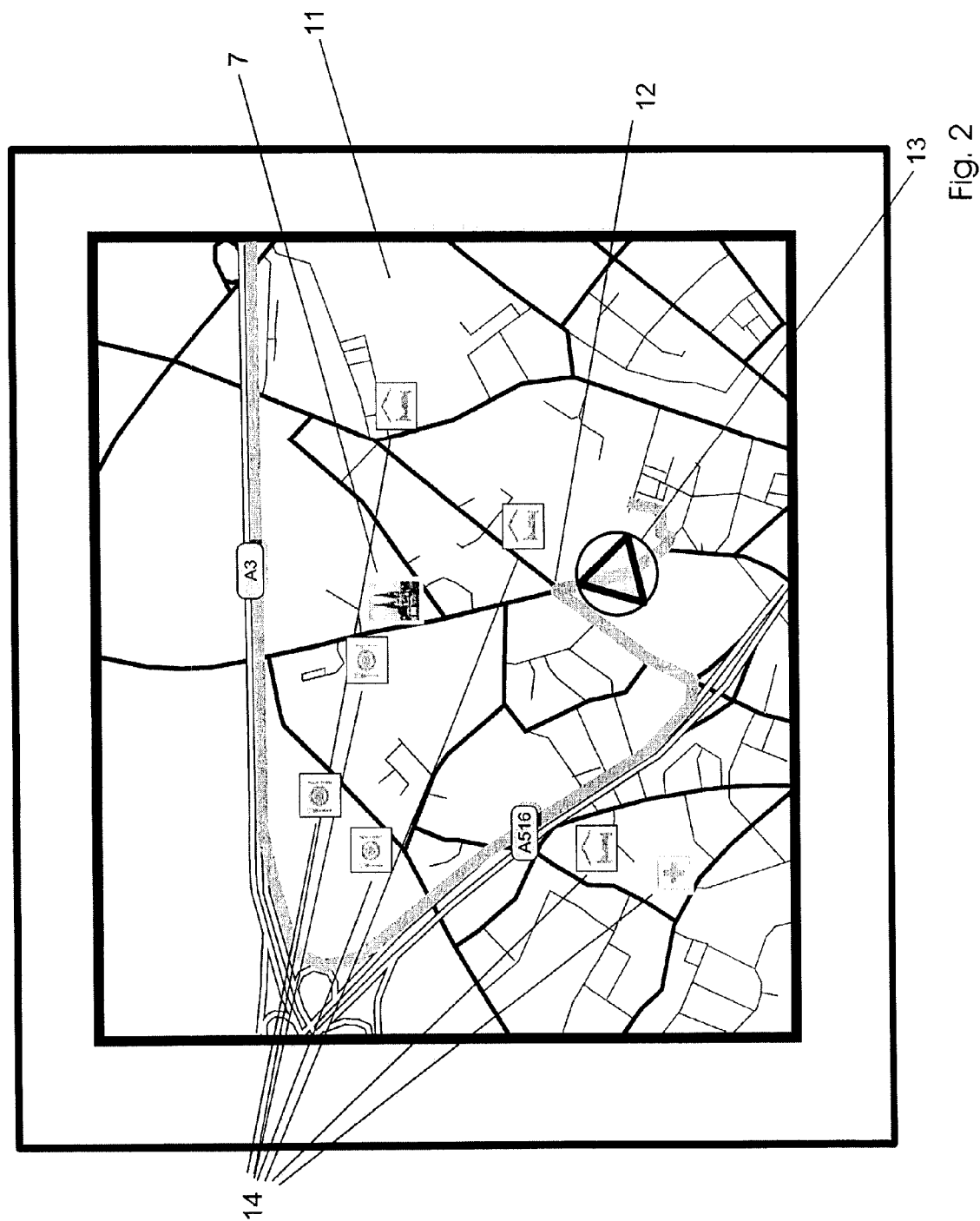
FIG. 2 shows the display according to FIG. 1 while a map is displayed, on which the address edited in accordance with FIG. 1 is superimposed.

In FIG. 2, an exemplary map 11 is displayed on the navigation system 1. At the location of the address "Cathedral of Saint Peter, Domplatz 1, Regensburg," the image content 7 assigned to the address is superimposed on the map 11. In addition, the route 12 and the current vehicle position 13 are superimposed on the map 11. The current vehicle position 13 is displayed in the form of a schematic arrow symbol in the example shown. Instead of using such an arrow symbol, the current vehicle position could also be indicated with a suitable vehicle icon that, for example, is specifically adapted to the respective type of vehicle.

In addition to road elements, icons for Points of Interest (POI) 14 are also shown on the map 11. The selection of the POI-icons 14 displayed in the respective map display differs in dependence on the configuration and the scale. In the example shown, pre-stored standard icons for restaurants, hotels and a hospital are used.

While there has been shown and described what are at present considered the preferred embodiment of the invention, it will be obvious to those skilled in the art that various changes and modifications can be made therein without departing from the scope of the invention defined by the appended claims. Therefore, various alternatives and embodiments are contemplated as being within the scope of the following claims particularly pointing out and distinctly claiming the subject matter regarded as the invention.

The invention claimed is:

1. A navigation device (1) comprising:
an input device for inputting operator commands and/or location data, particularly starting points and/or destinations;
a road network database;
a route calculating unit for calculating a planned route with consideration of the location data and the road network database, wherein the route leads from the starting point to the destination;
a signal receiving unit for receiving position signals, particularly GPS-signals;
a position determining unit that determines the current position based on the position signals;
at least one optical display device; and
an editable image database storing image data files (7) that are displayed on the display device, wherein the image data files can be managed in a user-defined fashion;
in which the image database forms part of an address database or can be linked to an address database, wherein a user-defined image data file (7) is assigned to individual addresses (2) of the address database.

2. The navigation device according to claim 1, in which several addresses of the address database form an address group, wherein a user-defined image data file is assigned to all addresses of the address group.

3. The navigation device according to claim 1, in which photographs, particularly photographs of buildings or persons, are stored in the image database as image data files (7).

4. The navigation device according to claim 1, in which the image data files are stored on a removable storage medium, particularly on an exchangeable memory card.

5. A navigation device (1) comprising:
an input device for inputting operator commands and/or location data, particularly starting points and/or destinations;
a road network database;
a route calculating unit for calculating a planned route with consideration of the location data and the road network database, wherein the route leads from the starting point to the destination;
a signal receiving unit for receiving position signals, particularly GPS-signals;
a position determining unit that determines the current position based on the position signals;
at least one optical display device; and
an editable image database storing image data files (7) that are displayed on the display device, wherein the image data files can be managed in a user-defined fashion;
in which the navigation device (1) has graphic display functions that are displayed on the display device, wherein a user-defined image data file is assigned to individual display functions, and wherein the assigned image data file (7) is displayed when the display function is invoked.

6. The navigation device according to claim 5, in which a graphic display function is provided for displaying the current position of a vehicle, wherein a user-defined image data file can be superimposed on the map displayed on the display device at the current position of the vehicle.

7. A method for operating a navigation device (1) having an input device for inputting operator commands and/or location data, particularly starting points and/or destinations, a road network database, a route calculating unit for calculating a planned route with consideration of the location data and the road network database, wherein the route leads from the starting point to the destination, a signal receiving unit for receiving position signals, particularly GPS-signals, a position determining unit that determines the current position based on the position signals, and at least one optical display device, said method comprising:
storing an image data file (7) in an editable image database of the navigation device by the user of the navigation device (1); and
displaying the image content of the image data file (7) on the display device;
in which the image database forms part of an address database or can be linked to an address database, wherein a user-defined image data file (7) is assigned to individual addresses (2) of the address database, and wherein the display of a map section (11) that comprises an address (2) with an image data file (7) assigned thereto on the display device results in the image content of the assigned image data file (7) being displayed at the position of the address.

8. The method according to claim 7, in which a list of available image data files is displayed during the editing of a new address (2) to be stored in the address database, wherein the selected image data file (7) is assigned to the new address (2).

9. The method according to claim 7, in which a display function that is assigned a user-defined image data file is invoked in a program-controlled fashion and the image content of an image data file (7) assigned to the display function is subsequently displayed.

10. The method according to claim 7, in which an image data file priority value (9) is assigned to individual addresses (2) of the address database with an image data file (7) assigned thereto, wherein the displayed image data file (7), particularly the image size of the displayed image data file (7), is changed in dependence on the scale of the map section and/or in dependence on the image data file priority value.

11. The method according to claim 7, in which the image data files (7) are downloaded to the navigation device from a database, particularly from an Internet server, via a data link and are stored on the navigation device.

12. The method according to claim 7, in which an image data file (7) is assigned to a location that is pre-stored in the road network database, particularly a Point of Interest (POI).

13. The method according to claim 7, in which a location pre-stored in the road network database, particularly a Point of Interest (POI), is stored in the address database in the form of a new address (2) and is simultaneously assigned an image data file (7).

14. The method according to claim 7, in which the size of an image data file (7) is checked in a program-controlled fashion when the image data file (7) is stored and/or assigned to an address (2) or a display function.

15. The method according to claim 14, in which the storage and/or assignment of the image data file (7) is prevented if a predefined maximum size is exceeded.

16. The method according to claim 14, in which the size of the image data file (7) is automatically reduced, particularly by means of scaling, if a predefined maximum size is exceeded.

17. A method for operating a navigation device (1) having an input device for inputting operator commands and/or location data, particularly starting points and/or destinations, a road network database, a route calculating unit for calculating a planned route with consideration of the location data and the road network database, wherein the route leads from the starting point to the destination, a signal receiving unit for receiving position signals, particularly GPS-signals, a position determining unit that determines the current position based on the position signals, and at least one optical display device, said method comprising:

storing an image data file (7) in an editable image database of the navigation device by the user of the navigation device (1); and displaying the image content of the image data file (7) on the display device;

in which the image database forms part of an address database or can be linked to an address database, wherein a user-defined image data file (7) is assigned to individual addresses (2) of the address database, and wherein the display of a selection menu that comprises an address (2) with an image data file (7) assigned thereto on the display device results in the assigned image data file being displayed at the position of the address.

* * * * *